United States Patent Office 2,839,533
Patented June 17, 1958

2,839,533
METHOD FOR THE PREPARATION OF PIPERAZINES

Joseph J. Scigliano and Edgar C. Britton, Midland, Mich., assignors to The Dow Chemical Company, Midland, Mich., a corporation of Delaware No Drawing. Application March 12, 1956
Serial No. 570,715

7 Claims. (Cl. 260—268)

This invention relates to an improved method for the preparation of piperazines from alkanolamine hydrohalides.

It is known to prepare piperazines by cyclizing ethanolamine hydrohalides at an elevated temperature. Thus, in British Patent No. 595,430, there is disclosed a method for the preparation of piperazine which involves heating an ethanolamine hydrohalide at a temperature between 200 and 270° C., preferably between 220 and 250° C. and with the assistance of a dehydration catalyst, for a period of time as long as 24 hours. However, even under the most favorable conditions, the yields which can be obtained by practice of the disclosed technique are not as high as might be desired.

It would be advantageous, and it is among the principal objectives of the present invention, to provide a superior method for the preparation of piperazines from alkanolamine hydrohalides which, in contrast with the known art, does not require any catalytic assistance for optimum results and in which significant and satisfactory product yields may be consistently obtained in shorter periods of itme. It would also be advantageous, and it is among the ancillary objectives of the present invention, to provide a more facile method for the preparation of piperazines from alkanolamine hydrohalides which could easily be practiced with the employment of conventional and commonly available apparatus.

These and other desiderata may be realized according to the method of the present inevntion which comprises dispersing an alkanolamine hydrohalide in an inert liquid dispersant vehicle; cyclizing the alkanolamine hydrohalide by heating it to an elevated temperature while it is maintained in liquid dispersion in the inert vehicle until substantial portions of the alkanolamine hydrohalide are converted to a piperazine hydrohalide product in the reaction mass; and thereafter recovering a piperazine product therefrom. Advantageously, the alkanolamine hydrohalide may be converted whiel the reaction mass is being maintained at a pH which is not more acid than about 3.5. More advantageously, the reaction may be conducted with the pH of the reaction mass being maintained in the neighborhood of about 5. Such conditions are more favorable to the employment of stainless steel and other apparatus comprised of equivalent materials of construction which may be susceptible to excessive corrosion and to causing product contamination when they are subjected to severely acid exposures.

Piperazine and substituted piperazine products including 2,5-dimethylpiperazine and the like may be prepared with high conversions of the starting alkanolamine hydrohalides and correspondingly high, yields of the desired piperazine products. Yields of the piperazine and substituted piperazine products from the converted alkanolamine hydrohalides which are in the neighborhood of 50 ot 85 percent and even higher may consistently and reliably be experienced with the present method. In addition, especially when the pH of the reaction mass is maintained at a level which is out of the excessive acidity range, it is possible to disperse the alkanolamine hydrohalides and to conduct the reaction in stainless steel and like apparatus.

The alkanolamine hydrohalides which may be employed most beneficially in the practice of the present invention contain from 2 to 8 carbon atoms and may be represented by the general formula:

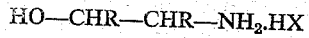

HO—CHR—CHR—NH$_2$.HX wherein, within the foregoing limitation, each R may be independently selected from the group consisting of a hydrogen atom and a substituent alkyl radical containing from 1 to 4 carbon atoms and X is a halogen atom which advantageously may be bromine or chlorine. The piperazine products which advantageously may be obtained from such starting materials are of the general formula:

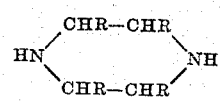

$$HN\begin{array}{c}CHR-CHR\\ \\CHR-CHR\end{array}NH$$

wherein each R may be independently selected from the group consisting of hydrogen atom and an alkyl radical containing from 1 to 4 carbon atoms. Alkanolamine hydrohalides which are derived from alkanolamines that contain from 2 to 4 carbon atoms in their molecules such as ethanolamine, 1-amino-2-propanol and 1-amino-2-butanol may be employed according to the present invention with especial advantage for the preparation of piperazine, 2,5-dimethylpiperazine and 2,5-diethylpiperazine, respectively. Mixed products can be obtained by utilizing desired mixtures of suitable starting materials.

The inert liquid vehicle which is employed as a medium in which to conduct the reaction should, as is implied, be substantially inert to the alkanolamines, alkanolamine hydrohalides, intermediate piperazine hydrohalides and piperazine product which may be involved. It should permit ready isolation of the desired products without difficulties due to the formation of troublesome azeotropic mixtures. The inert vehicle may be a solvent for the starting materials or for the desired intermediate and the final products, or for any combination thereof, or it may effectively be employed as a dispersing medium which may or may not require agitation and mixing for maintaining the reactant material in dispersion. In many instances it may be advantageous to employ a vehicle which does not dissolve the piperazine product in order to facilitate product isolation in a more convenient manner.

The inert vehicle may have any desired boiling point. When lower boiling vehicles are employed it is desirable to conduct the reaction under pressure to facilitate attainment of a suitable reaction temperature. It is usually beneficial to employ a vehicle which has a boiling point in excess of about 175° C. In many cases it may be preferred to utilize a vehicle having a boiling point which is appreciably greater than that of the starting materials or the products. Advantageously, in order to generally avoid conducting reactions under pressure, a vehicle that boils above 250° C. may be employed. Diphenyl ether and similar aromatic ethers including biphenylyl phenyl ether (which is also known as phenyl xenyl ether) and naphthyl phenyl ether may frequently be utilized with especial benefit as relatively high boiling inert dispersant vehicles in the practice of the present invention. Biphenyl may also be satisfactorily utilized for such purposes. In certain instances, however, relatively lower boiling hydrocarbons and other materials may be employed suitably. For example, various alkyl benzenes and alkylates diphenyl ethers are lower boiling materials which also are useful dispersant vehicles in the practice of the invention. Mixtures of suitable miscible liquids may also be made to constitute the vehicle.

The optimum temperature for the reaction will, as is apparent, vary with the particular alkanolamine hydrohalides which are being employed as well as with the boiling point of the inert vehicle which is utilized. Ordinarily, the reaction may be conducted advantageously at a temperature between about 200 and 350° C. Frequently, a temperature between about 250 and 300° C. may more advantageously be employed for the reaction.

The pH of the reaction mass may be effectively controlled in various ways in order to maintain it in a beneficial operating range of greater suitability for the employment of stainless steel and the like apparatus. Thus, if the alkanolamine hydrohalide is especially prepared in the apparatus prior to practice of the method of the invention, it is generally desirable to employ a slight molar excess of alkanolamine to insure that excessive acidity may be avoided. Or small, acid-countereffecting quantities of the alkanolamine corresponding to that in the alkanolamine hydrohalide may be incorporated in the reaction mass along with the latter when it is directly employed as the starting material. The effective quantity to be employed for such purpose in particular instances can be readily determined by those skilled in the art. In an analogous manner, the pH of the reaction mass can be readily controlled by incorporating other materials therein which are equivalent bases to or weaker than the alkanolamine present in the hydrohalide. For example, such basic materials as tributylamine, triethylamine and the like and such buffer ingredients as tri-sodium phosphate and various sodium acid phosphates may usually be employed suitably for such purposes.

It is convenient to practice the invention with the alkanolamine hydrohalide in liquid dispersion being converted by batchwise techniques using apparatus equipped with efficient agitating means for the purpose. By such a procedure, satisfactorily high conversions of the starting materials to the desired products can commonly be easily obtained within 20 hours and frequently within as short a period as one-half hour or less. However, if it is preferred, the method can be conducted on a continuous basis by passing the reactant materials in the inert dispersant vehicle through a suitable reaction chamber.

The piperazine product may be recovered after neutralization of the piperazine hydrohalide intermediate with caustic or other suitable neutralizing substance. The isolation may be accomplished according to various techniques which are apparent to those skilled in the art. For example, solvent extraction, filtration, distillation and crystallization procedures may be employed in any desired or necessary manner in order to obtain the product in a required pure condition.

The invention is further illustrated in and by the following example although it is not intended to be limited thereto or restricted thereby:

*Example*

To about 152.5 grams (2.5 moles) of ethanolamine was added, with cooling, about 250 grams (2.5 moles) of concentrated aqueous hydrochloric acid having a specific gravity of about 1.18. About 300 grams of phenyl xenyl ether was then added to the mixture and the entire mass heated and stirred until excess water was removed. The reaction mass, dispersed in the inert vehicle with efficient agitation, was then maintained at a temperature between about 260–270° C. for a period of time of about 1½ hours. At the end of this time the reaction was terminated and the reaction mass cooled to a temperature of about 75° C. after which about 102.5 grams of 97.5 percent caustic soda (2.5 moles NaOH) and 100 milliliters of water were added for acid neutralization. An overall conversion of about 83.75 percent of the ethanolamine hydrochloride was obtained in the reaction mass. The neutralized reaction mass was then distilled under about 100 millimeters of mercury pressure and the distillate in the temperature range from about 52° C. to 135° C. was collected. It was found to contain about 0.89 moles of piperazine, indicating a yield of about 85 percent from the converted starting material.

Similar excellent yields may be obtained when 1-amino-2-propanol hydrochloride is converted to 2,5-dimethylpiperazine and when 1-amino-2-butanol hydrochloride is converted to 2,5-diethylpiperazine or when the hydrobromides are employed in place of the hydrochlorides and diphenyl ether or another relatively high boiling medium in place of phenyl xenyl ether. Likewise, good results may be had when any of the mentioned lower boiling inert mediums or those equivalent thereto are employed under suitable pressure in place of the phenyl xenyl ether.

What is claimed is:

1. Method for preparing a piperazine product having the general formula:

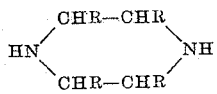

wherein each R is independently selected from the group consisting of a hydrogen atom and an alkyl radical containing from 1 to 4 carbon atoms, from an alkanolamine hydrohalide which contains from 2 to 8 carbon atoms in its molecule and which is represented by the general formula:

wherein, within the foregoing limitation, each R is independently selected from the group consisting of a hydrogen atom and a substituent alkyl radical containing from 1 to 4 carbon atoms and X is a halogen, which comprises dispersing the alkanolamine hydrohalide in an inert liquid dispersant vehicle; cyclizing the alkanolamine hydrohalide by heating it to a temperature between about 200 and 350° C. while it is maintained in liquid dispersion in the inert vehicle until substantial portions of the alkanolamine hydrohalide are converted to a piperazine hydrohalide product in the reaction mass; and thereafter recovering a piperazine product therefrom.

2. In the method of claim 1, cyclizing the alkanolamine hydrohalide by heating it to a temperature between about 250° C. and 300° C.

3. In the method of claim 1, heating the alkanolamine hydrohalide until a yield of at least about 50 to 85 percent of a piperazine product is recovered from the reaction mass.

4. The method of claim 1 wherein pressure is employed to maintain the alkanolamine hydrohalide in liquid dispersion in the inert vehicle.

5. The method of claim 1 wherein the inert vehicle is diphenyl ether.

6. The method of claim 1 wherein the inert vehicle is phenyl xenyl ether.

7. The method of claim 1, wherein the dispersion of the alkanolamine hydrohalide in said inert vehicle is mechanically agitated while it is being heated.

References Cited in the file of this patent

FOREIGN PATENTS 595,430    Great Britain _____ Dec. 4, 1947